April 10, 1951     E. MENDENHALL     2,548,229
LUBRICANT DIRECTOR
Filed Oct. 12, 1946
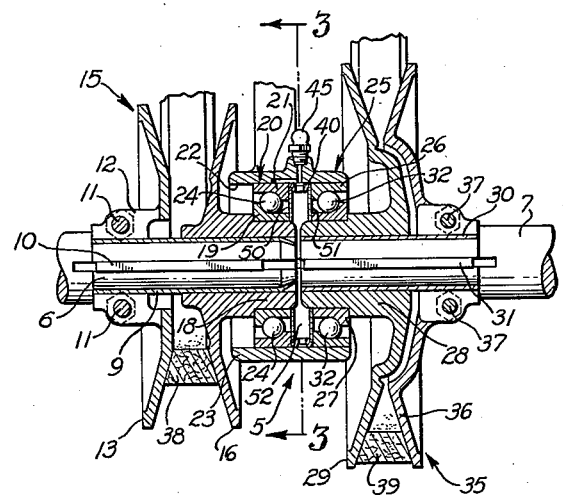
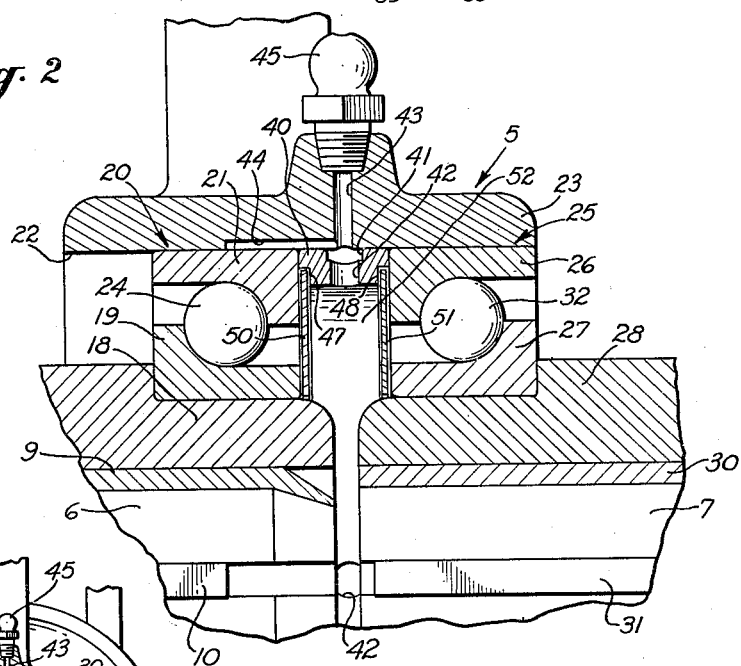
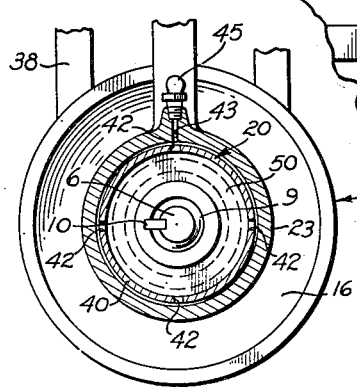
INVENTOR:
EARL MENDENHALL
By His Attorneys
HARRIS, KIECH, FOSTER & HARRIS Patented Apr. 10, 1951

2,548,229

UNITED STATES PATENT OFFICE 2,548,229

LUBRICANT DIRECTOR

Earl Mendenhall, San Marino, Calif., assignor to Sterling Electric Motors, Inc., Los Angeles, Calif., a corporation of California Application October 12, 1946, Serial No. 702,975

10 Claims. (Cl. 308—187)

My invention relates to power transmissions and more particularly to a power transmission in which a member such as a pulley or gear is carried on a rotating shaft on which the member slides.

It is an object of the invention to provide bearing means for supporting the shaft combined with means for directing lubricant to the sliding surface between the member and shaft.

The invention has a special utility when used in a structure more specifically described herein but which is also shown in the application of Bernhard N. Palm, Serial No. 549,356, filed August 14, 1944, now Patent No. 2,433,150, issued December 23, 1947, and owned by the assignee of this application.

Further objects of my invention will appear from the following specification and the drawing, which is intended for the purpose of illustration only, and in which:

Fig. 1 is a longitudinal sectional view through the bearing of the type commonly used in a transmission mechanism, showing my improved lubricant directing and retaining device as applied to use therewith;

Fig. 2 is an enlarged fragmentary sectional view of a portion of the bearing shown in Fig. 1; and Fig. 3 is a section on a plane defined by the line 3—3 of Fig. 1.

My invention is herein illustrated, by way of example, as applied to use in a bearing forming part of a power transmission mechanism but it will be obvious from the following description that it may be advantageously employed in the bearings of other machines or apparatus. Referring to the drawing in detail, the reference character 5 designates, generally, a bearing which forms part of the power transmission mechanism and which serves to rotatably support the adjacent reduced ends of a pair of coaxial shafts 6 and 7. The shaft 6, which for convenience of description may be considered the drive shaft of the mechanism, has a sleeve 9 on its reduced end which is splined to the shaft by a key 10 projecting through a slot in the sleeve. Rigidly clamped on the sleeve 9 by means of binder screws 11 and keyed rotatively with the shaft 6 by the key 10 is the split hub portion 12 of one member 13 of a driving pulley 15. Keyed rotatively with the shaft 6 by the key 10 and slidable axially toward and away from the pulley member 13 is the companion member 16 of the pulley 15.

The hub of the pulley member 16 has a reduced end 18 on which is rigidly secured the inner ball race 19 of a ball bearing 20. The outer ball race 21 of the ball bearing 20 is arranged to slide axially in the bore 22 of a boss or housing 23 forming part of the casing of the transmission mechanism. The ball bearing 20 is preferably of the combined radial and axial thrust type and has balls 24 revolvable between its inner and outer races.

A second ball bearing 25 has its outer ball race 26 slidable axially in the bore 22 and its inner race 27 is fixedly connected to the reduced end of the hub 28 of a pulley member 29. The pulley member 29 is slidable axially on a sleeve 30 and splined to the driven shaft 7 by a key 31 projecting through a slot in the sleeve. The ball bearing 25 is also of the combined radial and axial thrust type and includes balls 32 revolvable between its races. The member 29 constitutes the movable part of a two-part pulley 35, the other member 36 of the pulley 35 being clamped to the sleeve 30 by means of screws 37 and splined to the shaft 7 by the key 31.

The pulley 35 is of larger diameter than the pulley 15 and is adapted to be driven from the driving pulley 15 at a reduced rate of speed. The shaft 6 may rotate at a different speed than the shaft 7. The driving connections between the pulleys 15 and 35 are not herein shown since they may be of any known type. Suffice it to state that the pulley 15 usually drives a similar pulley mounted on a countershaft or other intermediate mechanism by means of a V-belt 38 and a second pulley on the countershaft may transmit rotary motion to the driven pulley 35 through the medium of a V-belt 39. Through suitable instrumentalities (not shown) the V-belts 38 and 39 are caused to move radially along the inner sloping faces of the pulleys 15 and 35 to vary the speed ratio between the driving and driven shafts 6 and 7, respectively. As the belt 38 is moved radially inward and outward the movable member 16 of the pulley 15 is shifted, respectively, away from and toward the fixed pulley member 13 and through means of the intermediate driving connections, referred to above, the movable member 29 of the driven pulley 35 is moved in the same direction. It will be apparent, therefore, that when the effective driving diameter of the pulley 15 is increased the effective driven diameter of the pulley 35 is decreased, and vice versa. To insure positive co-operation between the pulleys 15 and 35 a relatively narrow sleeve 40 is slidably disposed within the bore 22 between the outer races 21 and 26 of the respective ball bearings 20 and 25 so that when either of the movable pulley members 16 or 29 is shifted in a particular direction the movable member of the other pulley will be simultaneously shifted in the same direction. The sleeve 40 is provided with a peripheral groove 41 and with a plurality of circumferentially spaced openings 42 communicating with said groove.

The boss 23 is provided with an orifice 43 and a longitudinal groove 44 which is adapted to communicate with the groove 41 and the openings 42 of the sleeve 40. Screwed into a threaded counterbore of the orifice 43 is a lubrication fitting 45 which may be of any preferred type. Lubricant may be forced under pressure through the fitting 45, orifice 43, groove 44, groove 41 and the openings 42 and into the space between the bearings 20 and 25 by means of a suitable lubricating gun. To effect free sliding movement of the members 16 and 29 on their respective sleeves 9 and 30 it is essential that the bores of the members be lubricated and for this reason it is intended that the lubricant should flow into the bores. However, it has been determined that such lubricant usually follows the lines of least resistance and thus has the tendency to pass outwardly between the inner and outer races of the ball bearings 20 and 25 without lubricating the slidable pulley members. It is the aim of my invention to obviate this condition by providing means, to be next described, for retaining the lubricant within the bearing whereby to cause the lubricant to be distributed to the bores of the pulley members 16 and 29.

The end faces of the sleeve 40 are provided with circular recesses 47 and 48 adapted to receive retainer elements 50 and 51, respectively. Each of the elements 50 and 51 consists of a ring constructed from relatively thin, flexible sheet metal, such as phosphor-bronze, having a thickness which is less than the depth of the recesses 47 and 48. The outside diameter of each retainer element is slightly less than the diameter of the recess 47 or 48 in which it is disposed to adapt it to rotate in its respective recess and the inside diameter of each element is slightly greater than the diameter of the reduced portions of the hubs 18 and 28 so that clearance is provided between these parts.

Lubricant forced through the fitting 45, orifice 43 and groove 44, groove 41 and openings 42 will flow under pressure into the chamber 52 defined by the retainer elements 50 and 51 and the sleeve 40 to fill the space between the ball bearings 20 and 25. Some of the injected lubricant will flow through the central openings of the retainer elements 50 and 51 and around the outer edges thereof into the annular spaces between the balls 24 and 32 of the bearings 20 and 25, respectively, to lubricate the relatively movable parts of the ball bearings. However, as pressure is developed within the chamber 52 the retainer elements 50 and 51 will be forced laterally away from each other to cause them to be shifted into engagement with the sides of the inner and outer ball races of the ball bearings 20 and 25 to seal the chamber 52 and thus prevent the escape of lubricant from the bearing 5 by way of the ball bearings 20 and 25. It will be apparent therefore that when further lubricant is forced into the bearing 5 it will be directed into the clearance space between the slidable pulley members 16 and 29 and their respective sleeves 9 and 30 to effectively lubricate the pulley members and sleeves to provide a free sliding fit therebetween and to prevent wear of these parts.

It sometimes occurs that the side faces of the inner and outer ball race members of the ball bearing units are not aligned exactly due to inaccuracies in manufacture and wear of the bearing parts so that the face of one race member may project laterally beyond the face of the other race member to a slight degree. The relatively thin retainer elements 50 and 51 are adapted to flex when subjected to the pressure of the lubricant in the chamber 52 and thus each element is caused to engage both the inner and outer race members of the ball bearing unit with which it cooperates to positively seal the inner side of the ball bearing unit even though the inner faces of the race members are not exactly aligned. Because the retainer elements engage against both race members with the same pressure, any wear occurring in the portions of the elements which contact the race members will be equalized. It will be noted that the outer race members 21 and 26 of the respective ball bearing units 20 and 25 rotate at a lesser speed than the driven inner race members 19 and 27 but due to the fact that the retainer elements 50 and 51 contact the inner and outer race members only during the forcing of lubricant into the chamber 52 and are adequately lubricated during this time, no appreciable wear of the contacting surfaces of the retainer elements will ensue. The pressure-responsive retainer elements 50 and 51 normally are spaced from the race members, as shown in Fig. 2, by a film of lubricant and thus wear of the elements is negligible and the elements will last almost indefinitely without replacement.

It will be observed from the foregoing that my invention provides an extremely simple yet highly efficient means for controlling the distribution of lubricant within a bearing and is particularly adapted for use with bearings in which rotatable and slidable mechanical elements are supported. As a particular feature of the invention, the improved device is operated in response to the pressure of the lubricant introduced into the bearing to seal passages in the bearing through which the lubricant might be expelled. The device thus serves to retain the lubricant within the bearing to cause the same to be distributed throughout the interior of the bearing whereby to lubricate parts therein which might otherwise be insufficiently lubricated. As another important feature of improvement, my invention provides a device which is particularly adapted for use in bearing housings wherein one or more ball bearing units are employed for supporting rotary parts and in which the units are slidable within the housing, the device acting to permit the flow of a predetermined amount of lubricant to the ball bearing units to adequately lubricate the same and to thereafter seal the annular openings between the ball races of the units to prevent escape of the lubricant from the housing. Moreover, the lubricant sealing device employs resilient retainer elements which are adapted to flex to conform to the surfaces which they engage so that a firm, leak-proof contact therewith is effected. Since the retainer elements are adequately lubricated at all times they resist wear and may be employed over long periods of time without replacement.

While I have shown the lubricant retaining and directing means as embodied in a preferred form of construction, by way of example, it will be understood that it may be modified in various particulars without departing from the spirit of the invention. Consequently, I do not desire to be limited by the foregoing specification, but desire to be afforded the full scope of the appended claims.

I claim as my invention:

1. A lubricant sealing device adapted to seal lubricant in a bearing which includes an anti-friction bearing unit having outer and inner race members with straight sides and elements rollable between said race members, comprising: a thin, flexible pressure-responsive sealing member floatingly mounted entirely within said bearing and movable bodily toward said straight sides of said outer and inner races.

2. A lubricant sealing device adapted to seal lubricant in a bearing which includes an anti-friction bearing unit having outer and inner race members with straight sides and elements rollable between said race members, comprising: a thin, flexible pressure-responsive sealing ring floatingly mounted entirely within said bearing adjacent but outside said outer and inner race members and normally spaced from said race members so that lubricant introduced into said bearing under a predetermined pressure can pass between said outer and inner race members, said sealing ring being slidable and flexible so as to engage said straight sides of said race members of said bearing unit in response to lubricant pressures exceeding said predetermined pressure to seal said race members against passage of said lubricant between said outer and inner race members.

3. A lubricant sealing device adapted to seal lubricant in a bearing housing which includes an anti-friction bearing unit having outer and inner race members with aligned, straight non-recessed sides and elements rollable between said race members, comprising: an annular member disposed outside said bearing unit and having a planar face disposed adjacent said aligned race members of said bearing unit and provided with an annular recess; and a resilient flexible sealing ring rotatable and slidable axially in said recess, said sealing ring being of less thickness than the depth of said recess so that said ring can slide therein toward and away from said bearing unit.

4. A bearing structure for rotatably supporting an element, including: a housing; an anti-friction bearing unit in said housing, said unit comprising outer and inner race members and rollable elements between said race members; means for introducing lubricant into said housing under pressure; and a slidable flexible sealing ring normally spaced from said race members to permit lubricant introduced into said housing under a predetermined pressure to pass between said outer and inner race members, said sealing member being adapted to be slid and flexed into sealing engagement with said race members of said bearing unit in response to lubricant pressures exceeding said predetermined pressure to prevent the passage of said lubricant between said outer and inner race members.

5. A bearing structure for supporting a rotatable and axially movable member, including: a housing; an anti-friction bearing unit in said housing for supporting said member, said bearing unit being connected to and movable with said member, said unit having outer and inner race members and revolvable elements between said race members; means for introducing lubricant into said housing under pressure; and a flexible sealing ring slidable within said housing and normally spaced from said outer and inner race members to permit lubricant introduced into said bearing under a predetermined pressure to pass between said outer and inner race members, said sealing member being adapted to be slid and flexed into sealing engagement with said outer and inner race members in response to lubricant pressures exceeding said predetermined pressure to prevent the passage of said lubricant between said outer and inner race members.

6. A bearing structure for supporting a pair of rotatable and axially movable members, including: a housing; a pair of spaced anti-friction bearing units slidable in said housing, each of said units comprising an outer race member, an inner race member and balls revolvable between said race members, each of said inner race members supporting one of said rotatable and movable members; means for introducing lubricant into said housing under pressure; an annular member disposed between and connecting said outer race members for unitary axial movement; flexible sealing rings slidably mounted between each side of said annular member and the bearing unit on its respective side and normally spaced therefrom to permit lubricant introduced into said housing under a predetermined pressure to pass between the outer and inner race members of each bearing unit, each of said sealing rings being adapted to be slid and flexed into sealing engagement with said outer and inner race members of said bearing units in response to lubricant pressures exceeding said predetermined pressure to prevent the passage of said lubricant between said outer and inner race members.

7. In a power transmission, the combination of: a bearing housing having a cylindrical opening therein; a driving shaft within said opening; a driven shaft coaxial with said driving shaft; a driving member rotatable with but slidable axially on said driving shaft; a driven member rotatable with but slidable axially on said driven shaft; a driving shaft ball bearing unit slidable within limits axially in said opening, said ball bearing unit fitting on and rotatively supporting said driving member; a driven shaft ball bearing unit slidable axially in said opening, said driven shaft ball bearing unit fitting on and rotatively supporting said driven member, said bearing housing having a port through which lubricant may be injected into a chamber provided between said ball bearing units and the adjacent ends of said shafts; an annular member disposed between said bearing units and slidable therewith in said opening; and flexible sealing members slidably disposed between said annular member and said ball bearing units and operative to retard the flow of lubricant from said chamber through said ball bearing units.

8. In a power transmission, the combination of: a bearing housing having a cylindrical opening therein; a driving shaft in said opening; a driven shaft coaxial with said driving shaft; a driving member rotatable with but slidable axially on said driving shaft; a driven member rotatable with but slidable axially on said driven shaft; a driving shaft ball bearing unit slidable within limits axially on said opening, said ball bearing unit fitting on and rotatively supporting said driving member; a driven shaft ball bearing unit slidable axially in said opening, said driven shaft ball bearing unit fitting on and rotatively supporting said driven member, said bearing housing having a port through which lubricant may be injected into a chamber provided between said ball bearing units and the adjacent ends of said shafts; an annular member disposed between said bearing units and slidable therewith in said opening, said annular member having an annular recess in each of its planar faces; and resilient, flexible sealing rings slidable and rotatable in said recesses, said rings being responsive to lubricant pressure within said chamber to slide and flex against said bearing units to seal any openings through said bearing units and thus prevent the flow of lubricant from said chamber through said ball bearing units.

9. A sealing device for use in sealing the raceway of an antifriction bearing having inner and outer annular races, said races having aligned, non-recessed sides defining together a planar face, comprising: a sleeve member having a circular recess in at least one of its end faces; and a pressure-responsive, flexible, sealing member floatingly disposed in said recess, said device being placeable against said planar face of the antifriction bearing, and said pressure-responsive sealing member being slidable in said recess and flexible so as to engage said planar face of the antifriction bearing in response to a predetermined pressure of lubricant introduced into said sleeve.

10. A sealing device for use in sealing the raceways of a pair of spaced, axially aligned antifriction bearings having inner and outer annular races, the races of each bearing together defining a planar face, comprising: a sleeve member having circular recesses in its end faces and a radial opening communicating with its interior; and a pair of pressure-responsive, flexible, sealing members each floatingly disposed in one of said recesses, said device being disposed between said antifriction bearings, and said pressure-responsive members being slidable axially in said recesses and flexible into firm engagement with said planar faces of the antifriction bearings in response to a predetermined pressure of lubricant introduced into said sleeve through said radial opening.

EARL MENDENHALL.

REFERENCES CITED

The following references are of record in the file of this patent:

UNITED STATES PATENTS

| Number | Name | Date |
|---|---|---|
| 2,124,526 | Goldsworthy | July 26, 1938 |
| 2,340,704 | Shaw | Feb. 1, 1944 |

FOREIGN PATENTS

| Number | Country | Date |
|---|---|---|
| 11,787 | Great Britain | 1908 |